(12) United States Patent
Schober et al.

(10) Patent No.: US 12,273,835 B2
(45) Date of Patent: Apr. 8, 2025

(54) COMMUNICATION DEVICE AND METHOD OF OPERATING THE SAME

(71) Applicant: NXP B.V., Eindhoven (NL)

(72) Inventors: Michael Schober, Graz (AT); Frank Leong, Veldhoven (NL); Dominik Doedlinger, Wildon (AT)

(73) Assignee: NXP B.V., Eindhoven (NL)

( * ) Notice: Subject to any disclaimer, the term of this patent is extended or adjusted under 35 U.S.C. 154(b) by 538 days.

(21) Appl. No.: 17/651,949

(22) Filed: Feb. 22, 2022

(65) Prior Publication Data
US 2022/0295430 A1    Sep. 15, 2022

(30) Foreign Application Priority Data
Mar. 12, 2021    (EP) .................................... 21162461

(51) Int. Cl.
*H04W 56/00*    (2009.01)
*H04W 12/122*    (2021.01)

(52) U.S. Cl.
CPC ..... *H04W 56/002* (2013.01); *H04W 56/0055* (2013.01)

(58) Field of Classification Search
CPC ....................... H04W 88/00–06; H04W 24/10
See application file for complete search history.

(56) References Cited

U.S. PATENT DOCUMENTS

| | | | | |
|---|---|---|---|---|
| 2009/0257426 A1* | 10/2009 | Hart | ...................... | G01S 5/0226 370/350 |
| 2012/0083304 A1* | 4/2012 | Yang | ................. | H04W 56/0035 455/507 |
| 2015/0139212 A1* | 5/2015 | Wang | ....................... | G01S 5/06 370/338 |

(Continued)

FOREIGN PATENT DOCUMENTS

GB    2584733 A    12/2020

OTHER PUBLICATIONS

IEEE P802.15.4z™M/D08, "Draft Standard for Low-Rate Wireless 2 Networks, Amendment: Enhanced Ultra Wideband (UWB) Physical Layers (PHYs) and Associated Ranging Techniques;" Mar. 2020, Best Available Date: Aug. 27, 2020.

(Continued)

*Primary Examiner* — San Htun

(57) ABSTRACT

In accordance with a first aspect of the present disclosure, a communication device is provided, comprising: a communication unit configured to execute a time-of-flight ranging session with an external communication counterpart; a clock offset measurement unit configured to measure a frequency offset of a device clock, wherein said device clock is configured to be used by the communication unit when said ranging session is executed; a processing unit configured to determine whether the measured frequency offset of the device clock has a predefined correlation with a frequency offset of a counterpart clock, wherein said counterpart clock is configured to be used by the external communication counterpart when said ranging session is executed. In accordance with a second aspect of the present disclosure, a corresponding method of operating a communication device is conceived. In accordance with a third aspect of the present disclosure, a corresponding computer program is provided.

20 Claims, 7 Drawing Sheets

(56) References Cited

U.S. PATENT DOCUMENTS

2016/0234008 A1* 8/2016 Hekstra .................. H04W 4/80
2019/0306825 A1* 10/2019 Lindskog .............. H04W 24/10
2020/0045661 A1* 2/2020 Verso .................... H04W 84/20

OTHER PUBLICATIONS

Singh, Mridula et al.; "UWB-ED: Distance Enlargement Attack Detection in Ultra-Wideband;" 28th USENIX Security Symposium, USENIX Security 2019; Aug. 14-16, 2019; Santa Clara, California, Best Available Date: Version—Feb. 14, 2019.

Poturalski, Marcin et al.; "The Cicada Attack: Degradation and Denial of Service in IR Ranging," 2010 IEEE International Conference on Ultra-Wideband; Sep. 20-23, 2010; Nanjing, China; DOI: 10.1109/ICUWB.2010.5616900, Best Available Date: Sep. 20-23, 2010.

Hancke, G.P. et al; "An RFID Distance Bounding Protocol," First International Conference on Security and Privacy for Emerging Areas in Communications Networks (SECURECOMM'05); Sep. 5-9, 2005; Athens, Greece; http://dx.doi.org/10.1109/SECURECOMM.2005.56.

Dotlic I. et al, "Ranging Methods Utilizing Carrier Frequency Offset Estimation," Oct. 25-26, 2018, IEEE 15th Workshop on Positioning, Navigation and Communication; Bremen, Germany; DOI: 10.1109/WPNC.2018.8555809, Best Available Date: 2005 by IEEE.

* cited by examiner

COMMUNICATION DEVICE AND METHOD OF OPERATING THE SAME

CROSS-REFERENCE TO RELATED APPLICATIONS

This application claims priority under 35 U.S.C. § 119 to European Patent Application No. 21162461.4, filed on Mar. 12, 2021, the contents of which are incorporated by reference herein.

TECHNICAL FIELD

The present disclosure relates to a communication device. Furthermore, the presently disclosure relates to a corresponding method of operating a communication device, and to a corresponding computer program.

BACKGROUND

Ultra-wideband (UWB) is a technology that uses a high signal bandwidth, in particular for transmitting digital data over a wide spectrum of frequency bands with very low power. For example, ultra-wide band technology may use the frequency spectrum of 3.1 to 10.6 GHz and may feature a high-frequency bandwidth of more than 500 MHz and very short pulse signals, potentially capable of supporting high data rates. The UWB technology enables a high data throughput for communication devices and a high precision for the localization of devices. In particular, UWB technology may be used for so-called ranging operations, i.e., for determining the distance between communicating devices.

SUMMARY

In accordance with a first aspect of the present disclosure, a communication device is provided, comprising: a communication unit configured to execute a time-of-flight ranging session with an external communication counterpart; a clock offset measurement unit configured to measure a frequency offset of a device clock, wherein said device clock is configured to be used by the communication unit when said ranging session is executed; a processing unit configured to determine whether the measured frequency offset of the device clock has a predefined correlation with a frequency offset of a counterpart clock, wherein said counterpart clock is configured to be used by the external communication counterpart when said ranging session is executed.

In one or more embodiments, the communication unit is a UWB communication unit, and the processing unit is configured to receive data indicative of the frequency offset of the counterpart clock through the UWB communication unit.

In one or more embodiments, the communication device comprises a further communication unit, and the processing unit is configured to receive data indicative of the frequency offset of the counterpart clock through said further communication unit.

In one or more embodiments, the processing unit is configured to discard a result of the ranging session if the measured frequency offset of the device clock does not have said predefined correlation with the frequency offset of the counterpart clock.

In one or more embodiments, the predefined correlation is that the measured frequency offset of the device clock is equal to the inverse of the frequency offset of the counterpart clock within a given tolerance range.

In one or more embodiments, the processing unit is further configured to determine whether the measured frequency offset of the device clock has a further predefined correlation with a predetermined clock offset between the device clock and a reference clock and a predetermined clock offset between the counterpart clock and said reference clock.

In one or more embodiments, the further predefined correlation is that the product of the measured frequency offset of the device clock and the predetermined clock offset between the device clock and the reference clock is equal to the predetermined clock offset between the counterpart clock and said reference clock within a given tolerance range.

In one or more embodiments, the processing unit is further configured to determine whether the frequency offset of the counterpart clock has a predefined correlation with the measured frequency offset of the device clock and the predetermined clock offset between the counterpart clock and said reference clock.

In one or more embodiments, the predefined correlation includes that the product of the frequency offset of the counterpart clock and the predetermined clock offset between the counterpart clock and the reference clock is equal to the measured frequency offset of the device clock within a given tolerance range.

In one or more embodiments, the processing unit is configured to receive data indicative of the predetermined clock offset between the counterpart clock and said reference clock through the UWB communication unit or through a further communication unit of the communication device.

In one or more embodiments, the processing unit is configured to discard a result of the ranging session if: the measured frequency offset of the device clock does not have the further predefined correlation with the predetermined clock offset between the device clock and the reference clock and the predetermined clock offset between the counterpart clock and said reference clock; and/or the frequency offset of the counterpart clock does not have the predefined correlation with the measured frequency offset of the device clock and the predetermined clock offset between the counterpart clock and said reference clock.

In one or more embodiments, the reference clock is a cellular radio unit clock, a Wi-Fi communication unit clock, a global positioning system clock, or a clock derived from a UWB communication session with a trusted reference device.

In one or more embodiments, the processing unit is further configured to determine whether the measured frequency offset of the device clock has further predefined correlations with predetermined clock offsets between the device clock and a plurality of reference clocks and predetermined clock offsets between the counterpart clock and said reference clocks.

In accordance with a second aspect of the present disclosure, a method of operating a communication device is conceived, the communication device comprising a communication unit, a clock offset measurement unit and a processing unit, the method comprising: executing, by the communication unit, a time-of-flight ranging session with an external communication counterpart; measuring, by the clock offset measurement unit, a frequency offset of a device clock, wherein said device clock is used by the communication unit when said ranging session is executed; determining, by the processing unit, whether the measured frequency offset of the device clock has a predefined correlation with a frequency offset of a counterpart clock, wherein said counterpart clock is used by the external communication counterpart when said ranging session is executed.

In accordance with a third aspect of the present disclosure, a computer program is provided, comprising executable instructions which, when executed by a communication device, cause said communication device to carry out a method of the kind set forth.

DESCRIPTION OF DRAWINGS

Embodiments will be described in more detail with reference to the appended drawings, in which.

DESCRIPTION OF EMBODIMENTS

As mentioned above, ultra-wideband (UWB) is a technology that uses a high signal bandwidth, in particular for transmitting digital data over a wide spectrum of frequency bands with very low power. For example, ultra-wide band technology may use the frequency spectrum of 3.1 to 10.6 GHz and may feature a high-frequency bandwidth of more than 500 MHz and very short pulse signals, potentially capable of supporting high data rates. The UWB technology enables a high data throughput for communication devices and a high precision for the localization of devices. In particular, UWB technology may be used for so-called ranging operations, i.e. for determining the distance between communicating devices.

Ultra-wideband technology—also referred to as impulse-radio ultra-wideband (IR-UWB)—is a RF communication technology that uses pulses having a short duration for data communication. An important feature of IR-UWB technology is that it can be used for secure and accurate distance measurements between two or more devices. A typical distance measurement method is the so-called single-sided two-way ranging (SS-TWR) method. Because of hardware clock inaccuracies and associated compensation methods, SS-TWR can potentially be manipulated more easily compared to more advanced distance measurement methods such as the double-sided two-way ranging (DS-TWR) method.

Figure 1:
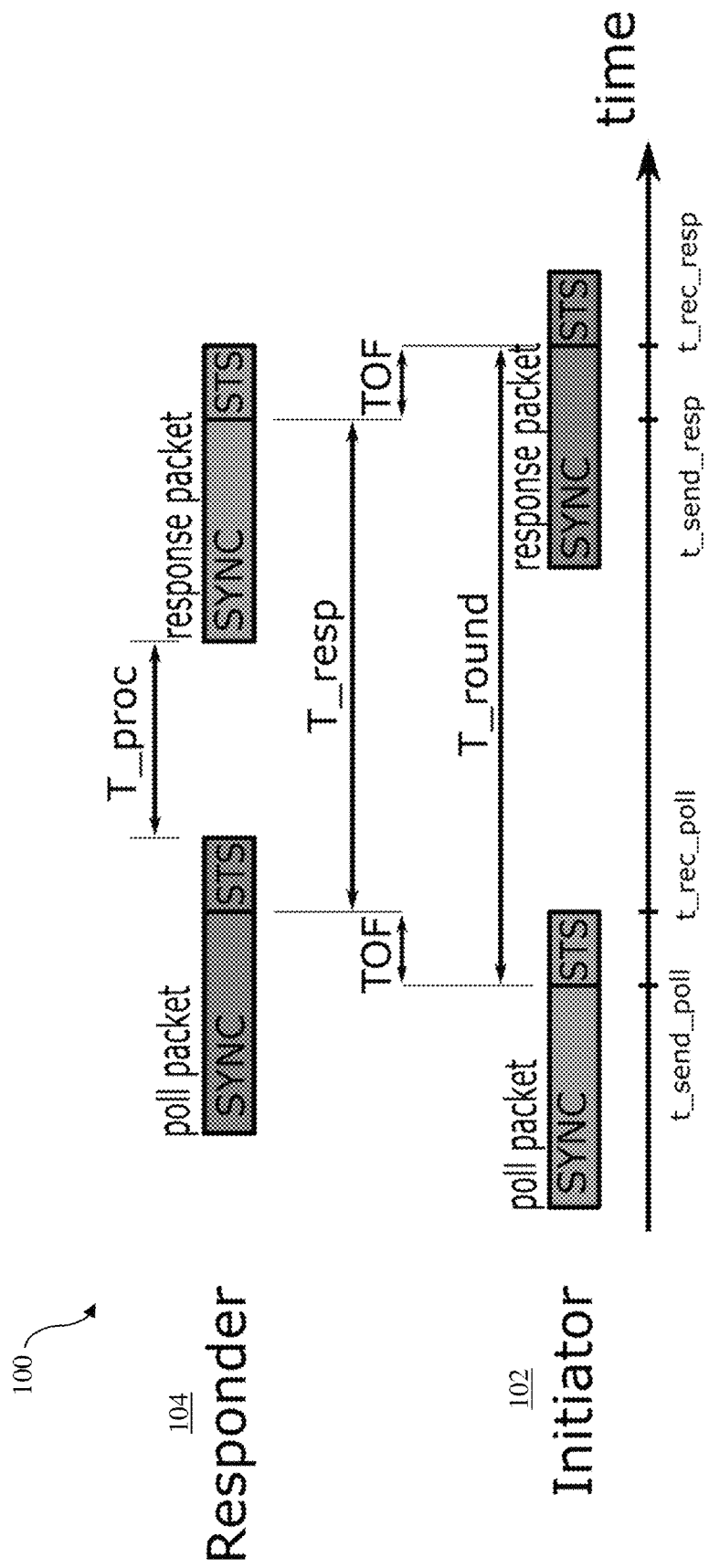
FIG. 1 shows a timing diagram of a single-sided two-way ranging (SS-TWR) session.

FIG. 1 shows a timing diagram 100 of a single-sided two-way ranging (SS-TWR) session. In particular, the timing diagram 100 shows an IR-UWB packet exchange for performing a SS-TWR session. A communication device, i.e., an initiator 102, transmits a poll message which is received by another communication device, i.e. a responder 104. The aim of the SS-TWR session is to determine the distance between the initiator 102 and the responder 104. The initiator 102 may, for example, be embedded in a vehicle (not shown), in which case the responder 104 may be embedded in a mobile phone which is used to access the vehicle. By accurately determining the distance between the initiator 102 and the responder 104, a so-called relay attack may be rendered ineffective. After processing the poll message, the responder 104 transmits a response message. Both communication devices 102, 104 have an accurate system clock which generates a timestamp whenever a message was received or transmitted. The initiator 102 stores the timestamp t_send_poll at the time when it transmits its poll message and t_rec_resp when it receives the response message from the responder 104. The responder 104 stores t_rec_poll when it receives the poll message and t_send_resp when it transmits the response message. The black line between the SYNC field of the packets and the scrambled timestamp sequence (STS) field of the packets symbolizes the packet reference marker that is used for generating the timestamps in this example. It is noted that the SYNC field is a field which is included in the preamble of a packet. It functions as a predefined known signal so that the receiver can synchronize on it. Additionally, it is used to generate a non-secure channel impulse response on the receiver side, to enable a non-secure time-of-arrival calculation. The preamble of packets has been defined in the technical standard IEEE 802.15.4: it consists of the SYNC field and a so-called start of frame delimiter (SFD) field. The SFD field is similar to the SYNC field, using the same basic sequences, but it also includes a symbol-level BPSK modulation pattern.

Using the stored timestamps, the time of flight (TOF) associated with the UWB message exchange can be calculated. The calculation of the TOF based on the measured timestamps is shown in equations (1) to (3). The measured timestamps can be either exchanged out-of-band (e.g., using Bluetooth) or in-band (e.g., by using UWB packets containing additionally a data segment for the timestamp exchange). The timestamps generated by the responder 104 can for example be transmitted to the initiator 102, such that the latter can use them to calculate the TOF. Subsequently, the calculated TOF can be used to estimate the distance between the initiator 102 and the responder 104.

$$T_{resp} = t_{send_{resp}} - t_{rec_{poll}} \tag{1}$$

$$T_{round} = t_{rec_{resp}} - t_{send_{poll}} \tag{2}$$

$$TOF = \frac{T_{round} - T_{resp}}{2} \tag{3}$$

Every IR-UWB ranging packet contains a pseudo-random modulated pulse sequence (i.e., a scrambled timestamp sequence) that is unique for every packet. The sequences are generated using one or more pre-shared secrets, such that both communication devices (i.e., the initiator 102 and the responder 104) know what the scrambled timestamp sequence (STS) of the poll packet and the response packet should be. It is noted that the STS may also advantageously be used on the receiver side to calculate the channel impulse response (CIR). Compared to calculating the CIR using the SYNC field, this is more secure, because only the initiator and the responder know the key (i.e., the pre-shared secret) to generate the STS. If the responder 104 receives a packet whose STS does not match the expected value, it may, for example, reject the packet and refrain from responding, such that the packet exchange will not be used for estimating the TOF. The initiator 102 behaves in an analogous way: if a packet is received whose STS does not match the expected value, then the message timestamp will not be used for calculating the TOF between the devices. If an attacker intends to inject a valid packet on the initiator 102 or responder 104 side, then he should know the STS of the packet. However, it is unlikely that the attacker will have such knowledge, or that he will be able to reconstruct it, without knowing either the pre-shared secret or receiving a transmitted packet from the initiator 102 or the responder 104. This means that without knowing the pre-shared secret, which is used for generating an STS, the attacker will not able to shorten the measured TOF between the initiator 102 or the responder 104. However, the TOF can only be accurately calculated as shown in equations (1) to (3) under the assumption that the initiator 102 or the responder 104 have an accurate clock with no or negligible clock offset, so that the timestamps needed for calculating the TOF can be measured without an error.

Figure 2:
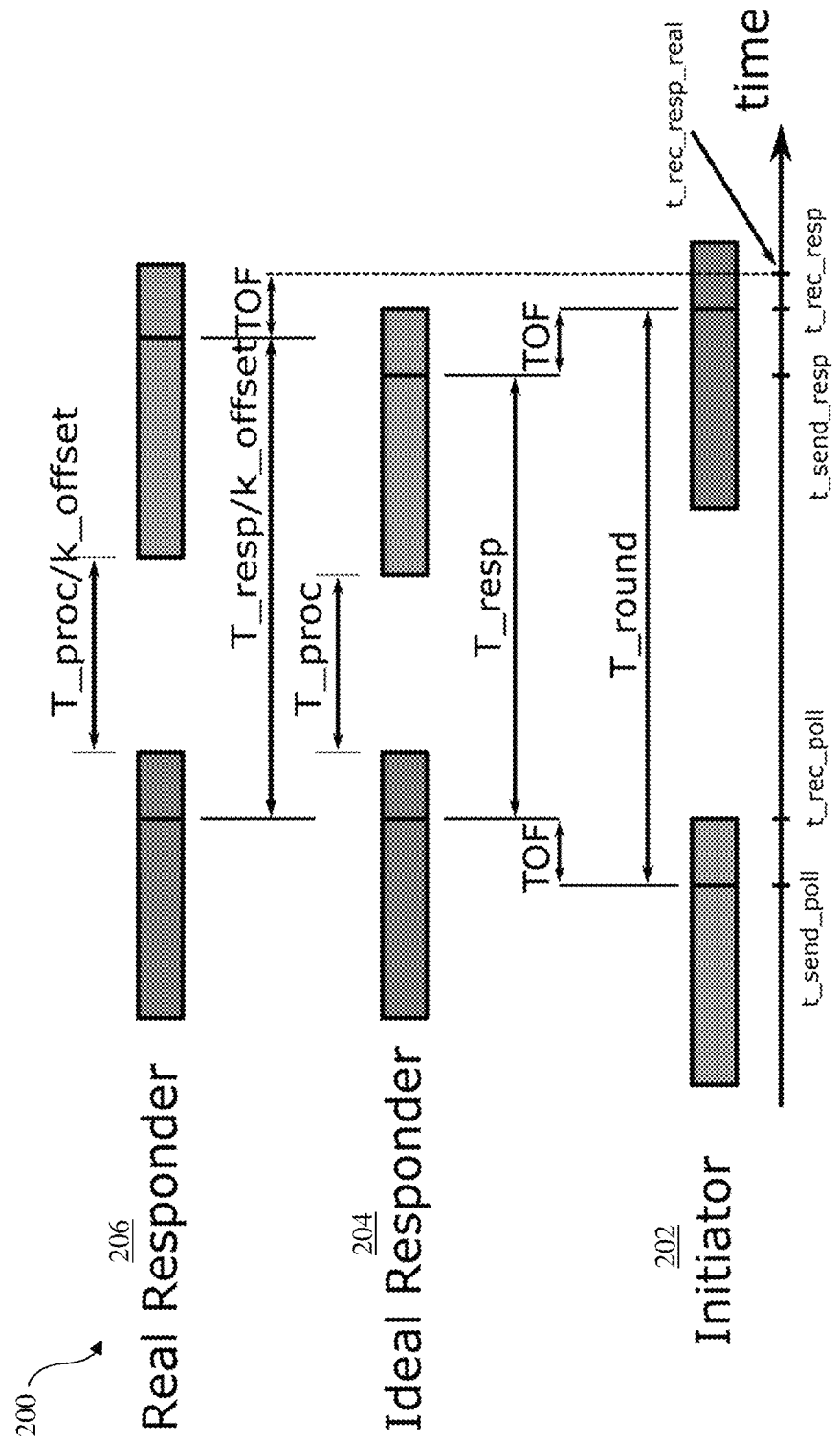
FIG. 2 shows a timing diagram of an SS-TWR session with a non-ideal clock.

FIG. 2 shows a timing diagram 200 of a SS-TWR session with a non-ideal clock. In particular, it is assumed that the initiator 202 has an ideal clock (i.e., a clock with no or negligible offset), but real responder 206 has a clock offset (i.e., an offset of the clock frequency) compared to an ideal responder 204. Thus, assumed are an initiator 202 having an ideal internal clock with clock frequency f_initiator and a responder 206 having a non-ideal clock frequency f_responder. The relation between f_initiator and f_responder is shown in equation (4).

$$f_{responder} = f_{initiator} * k_{offset} \quad (4)$$

This means that the physical response time at which the responder 206 transmits the response packet is scaled with a frequency scaling factor k_offset, but the actual measured response time on the responder side is constant and does not scale with the frequency scaling factor. The relation between the physical and measured response time is shown in equation (5).

$$T_{resp_{physical}} = T_{resp_{measured}} / k_{offset} \quad (5)$$

If the clock of the initiator 202 and the clock of the responder 206 are running on different unknown clock frequencies, then this will introduce a TOF calculation error. For the sake of simplicity, equations (6) and (7) show the impact of the clock frequency offset on the TOF calculation with an ideal initiator clock.

$$T_{round} = 2 * TOF + T_{resp_{physical}} \quad (6)$$

$$TOF_{calc} = \frac{T_{round} - T_{resp_{measured}}}{2} = \frac{2 * TOF + T_{resp_{physical}} - T_{resp_{physical}} * k_{offset}}{2} = TOF + \frac{T_{resp_{physical}}(1 - k_{offset})}{2} \quad (7)$$

Assuming a response time of 1 millisecond and a clock frequency offset of 10 parts per million (ppm) from an ideal clock, the clock offset based TOF calculation error is already 5 nanoseconds, which may result in a distance measurement error of approximately 1.5 meters. A typical method for compensating a clock frequency offset-based SS-TWR error is to measure the clock frequency offset on the responder side, such that this offset may be taken into account in the calculation. Equation (8) shows a TOF calculation which takes the measured clock frequency offset of the responder 206 into account.

$$TOF_{comp} = \frac{T_{round} - \frac{T_{resp_{measured}}}{k_{offset_{measured}}}}{2} = $$

$$TOF + \frac{T_{resp_{physical}}\left(1 - \frac{k_{offset}}{k_{offset_{measured}}}\right)}{2} \cong TOF$$

The advantage of compensating the effects of the clock frequency offset by taking it into account in the calculation is that the TOF measurement accuracy is increased. It is noted that an accurate TOF measurement is needed for correctly estimating the distance between the communication devices. Furthermore, without compensating the clock frequency, an attacker might reduce the measured distance merely by heating up or cooling down one of the devices in order to change the system clock of the initiator 202 or the responder 206. Unfortunately, also the clock offset-compensated SS-TWR may allow an attacker to reduce the calculated TOF by attacking the measured clock offset, e.g. on the initiator side. The clock offset can be measured either by measuring the carrier frequency of the incoming signal or by measuring across several pulses within the packet. An attacker might change the carrier frequency by demodulating the incoming RF signal and modulating the resulting baseband signal back on a higher carrier frequency. For changing the pulse repetition frequency (PRF) of an IR-UWB packet, the packet should be replayed faster or slower depending on the desired PRF change.

Figure 3:
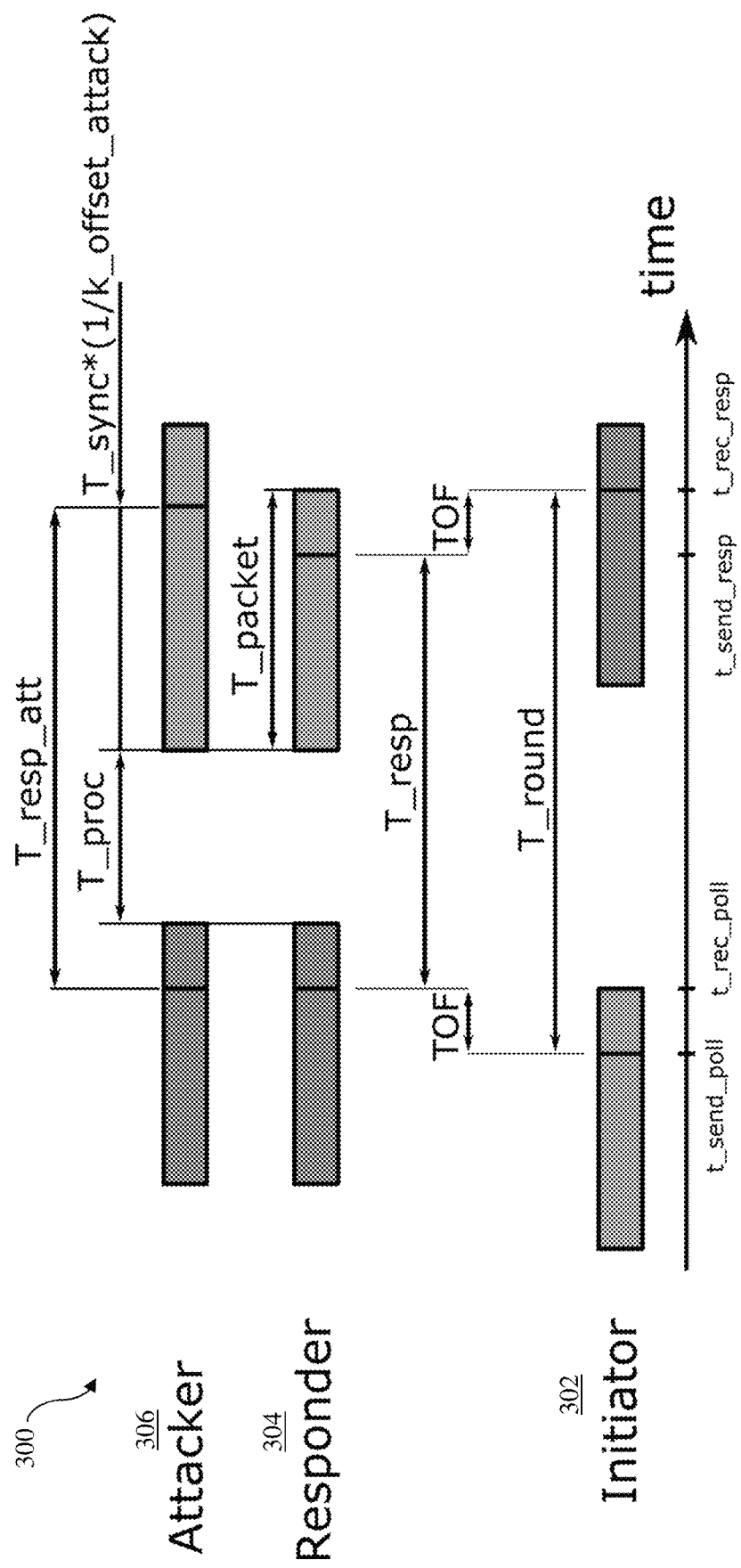
FIG. 3 shows a timing diagram of a clock-offset based SS-TWR attack.

FIG. 3 shows a timing diagram 300 of a clock-offset based SS-TWR attack. In particular, the clock offset-compensated SS-TWR attack scales up the length of the response packet. For the sake of simplicity, an ideal initiator and responder clock frequency is assumed for this attack scenario. Furthermore, the attacker 306 is an ideal attacker that is able to increase the packet duration by the factor k_offset_attack without adding a processing delay. The signal from the responder 304 to the initiator 302 is blocked, so that the initiator 302 receives the signal of the attacker 306 for estimating the clock frequency offset and the round-trip time. The impact of the upscaling of the packet duration is shown in equations (9) and (10). The impact of the attack on the TOF calculation is shown in equation (11). Assuming that T_sync is equal to T_packet, which is the worst case from an attacker perspective, this leads to equations (12) to (14).

$$T_{resp_{att}} = T_{resp} + T_{sync}\left(\frac{1}{k_{offset_{attack}}} - 1\right) \quad (9)$$

$$T_{round_{attack}} = T_{resp_{att}} + 2 * TOF \quad (10)$$

$$TOF_{attack} = \quad (11)$$

$$\frac{T_{round_{attack}} - \frac{T_{resp}}{k_{offset_{attack}}}}{2} = TOF + \frac{T_{resp_{attack}} - \frac{Tresp}{2k_{offset_{attack}}}}{2}$$

$$T_{resp} = T_{proc} + T_{packet} \quad (12)$$

$$T_{resp_{attack}} = T_{proc} + \frac{T_{fpacket}}{k_{offset_{attack}}} \quad (13)$$

$$TOF_{attack} = TOF + \frac{T_{proc}\left(1 - \frac{1}{k_{offset_{attack}}}\right)}{2} \quad (14)$$

Equation (14) shows that the impact of an attacker 306 on the TOF calculation has a linear relation with the required processing time of the responder 304 and it also has a relation with the clock offset introduced by the attacker 306. Assuming a maximum attack clock offset of 20 ppm and a processing time of 1 millisecond the attacker is able to reduce the measured TOF already by roughly 10 nanoseconds, which leads to a decreased distance measurement of approximately 3 meters. Such an attack has an unacceptable potential, so it is not acceptable for passive object access systems, such as vehicle access systems. It is noted that the term "passive" refers, in this context, to the fact that a user does not need to actively interact with the access system, for example by pressing a button or placing a badge on a reader. An example is of such a system is a passive keyless entry system for accessing a vehicle. The main benefit of passive access systems is that they are handsfree.

Now discussed are a communication device, a corresponding method of operating a communication device and a corresponding computer program, which facilitate increasing the robustness against attacks of the kind set forth. This, in turn, facilitates increasing the security level offered by handsfree object access systems, such as vehicle access systems.

Figure 4:
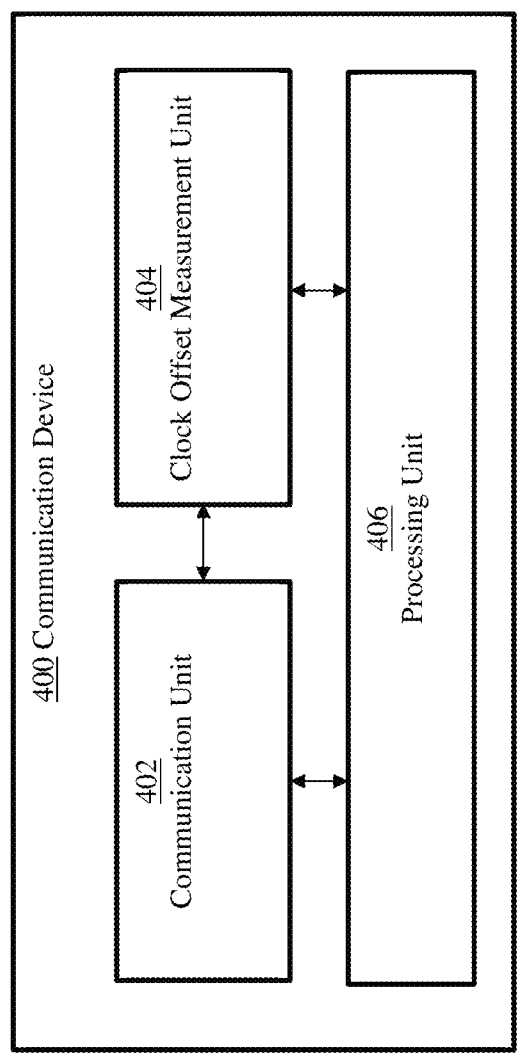
FIG. 4 shows an illustrative embodiment of a communication device.

FIG. 4 shows an illustrative embodiment of a communication device 400. The communication device 400 includes a communication unit 402, a clock offset measurement unit 404 and a processing unit 406. The communication unit 402 is configured to execute a time-of-flight ranging session with an external communication counterpart (not shown). The time-of-flight ranging session may be executed as a UWB ranging session. Alternatively, the time-of-flight ranging session may be executed as a Bluetooth High Accuracy Distance Measurement (HADM), which will be introduced in Bluetooth 6.0, a light or laser based two-way ranging session, or a 77 GHz frequency-modulated continuous-wave (FMCW) radar based two-way ranging session. It is noted that the term "external" means that the communication counterpart is a further communication device, which is not comprised in the communication device 400 shown in FIG. 4. The clock offset measurement unit 404 is configured to measure a frequency offset of a device clock, wherein said device clock is configured to be used by the communication unit when said ranging session is executed. Thus, the device clock is a clock which is comprised in or available to the communication device 400. In a practical implementation, the frequency offset may be measured by means of a frequency tracking loop of a coherent receiver. The clock delta of the incoming signal is inherently available when such a tracking loop is used, and can be stored, for example, in a register of a microcontroller. Furthermore, the processing unit 406 is configured to determine whether the measured frequency offset of the device clock has a predefined correlation with a frequency offset of a counterpart clock, wherein said counterpart clock is configured to be used by the external communication counterpart when said ranging session is executed. Thus, the counterpart clock is a clock which is comprised in or available to the further communication device, i.e., the device with which the communication device 400 performs the ranging session. By determining whether the measured frequency offset of the clock used by the communication device 400 itself has a predefined correlation with the frequency offset of the clock of the device with which it performs the ranging session, the detection of a clock-offset based SS-TWR attack is facilitated. This, in turn, facilitates increasing the level of security of the ranging session. In particular, the ranging session may reach a level of security which is similar to the level of security offered by a DS-TWR session, without requiring the same amount of resources as the latter. It is noted that the communication device 400 may either be an initiator or a responder in the ranging session. In other words, the determination whether the predefined correlation holds may be made by the initiator or by the responder.

In one or more embodiments, the communication unit is a UWB communication unit, and the processing unit is configured to receive data indicative of the frequency offset of the counterpart clock through the UWB communication unit. In this way, the determination as to whether the measured frequency offset of the device clock has a predefined correlation with the frequency offset of the counterpart clock is facilitated. In particular, the external communication counterpart may measure the frequency offset of the counterpart clock in a similar way as the clock offset measurement unit of the communication device and provide data indicative thereof to the communication device. For this purpose, a UWB communication channel may be used, which is typically already established when UWB technology is used for executing the ranging session, so that no additional communication unit needs to be provided. Alternatively, the communication device may comprise a further communication unit, such as a Bluetooth communication unit, through which said data can be provided to the processing unit of the communication device.

In a practical implementation, the processing unit is configured to discard a result of the ranging session if the measured frequency offset of the device clock does not have said predefined correlation with the frequency offset of the counterpart clock. In this way, an effective countermeasure may be realized against an attack, in the sense that the measured distance, which is the result of the ranging session, may be ignored and no access to the object may be granted on the basis of said result. Furthermore, in a practical implementation, the predefined correlation is that the measured frequency offset of the device clock is equal to the inverse of the frequency offset of the counterpart clock within a given tolerance range. This predefined correlation is defined in equation (16) shown below. It will be explained in more detail below that this predefined correlation represents a suitable criterion for determining whether a unilateral attack is performed (i.e., a unidirectional attack).

Figure 5:
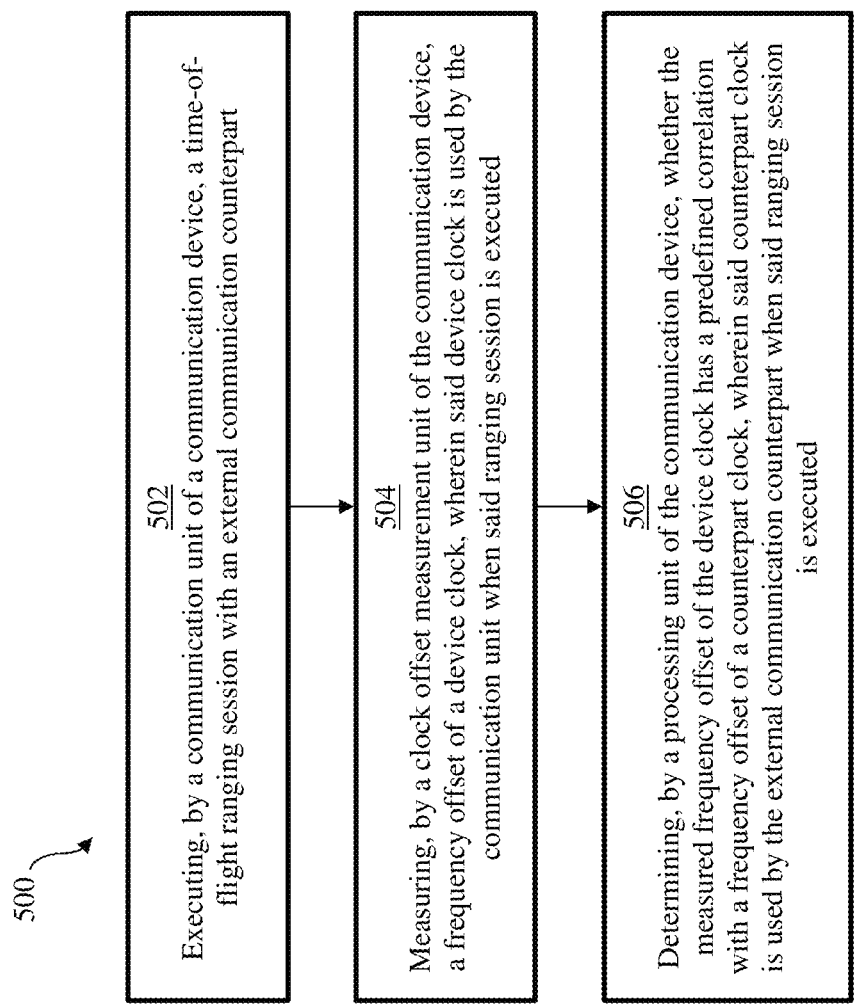
FIG. 5 shows an illustrative embodiment of a method of operating a communication device.

FIG. 5 shows an illustrative embodiment of a method 500 of operating a communication device. The method 500 includes the following steps. At 502, a communication unit of a communication device executes a time-of-flight ranging session with an external communication counterpart. Furthermore, at 504, a clock offset measurement unit of the communication device measures a frequency offset of a device clock, wherein said device clock is used by the communication unit when said ranging session is executed. Furthermore, at 506, a processing unit of the communication device determines whether the measured frequency offset of the device clock has a predefined correlation with a frequency offset of a counterpart clock, wherein said counterpart clock is used by the external communication counterpart when said ranging session is executed. As mentioned above, in this way, the detection of a clock-offset based SS-TWR attack is facilitated. This, in turn, facilitates increasing the level of security of the ranging session.

From the perspective of an attacker, the advantage of a unidirectional attack is that the attacker only needs to scale up or modify one packet, which leads to a lower attack complexity. Due to the low complexity of this type of attack, it can also be prevented in a less complex manner. If an initiator has an internal clock frequency f_initiator and a responder has an internal clock frequency f_responder, then the relation between the clock frequencies of the initiator and the responder is as shown in equation (15).

$$f_{responder} = f_{initiator} * k_{offset} \Rightarrow f_{initiator} = \frac{f_{responder}}{k_{offset}} \quad (15)$$

If both systems are able to measure the relative clock frequency offset of the incoming packet, then the relation between the clock frequencies of the initiator and the responder is as shown in equation (16).

$$k_{offset_{measured_{initiator}}} = \frac{1}{k_{offset_{measured_{responder}}}} \quad (16)$$

If an attacker scales up the response packet, then equation (16) will not hold anymore. This means that if the responder shares the measured clock frequency offset with the initiator, then the initiator will be able to detect an attack by comparing the measured clock frequency offsets, i.e., its own clock frequency offset with the clock frequency offset of the initiator. Since both sides will have a limited measurement accuracy, the equation (16) only needs to hold within given tolerance borders. The clock frequency measurement capability of a typical IR-UWB system is in the order of ppm accuracy. This means that the maximum frequency offset is smaller than the timestamp generation error, which makes an attack ineffective. Accordingly, for detecting a unidirectional SS-TWR attack, only the exchanged clock offsets need to be compared. If an attack has been detected, the corresponding timestamps may for example be excluded from the TOF measurement.

Figure 6:
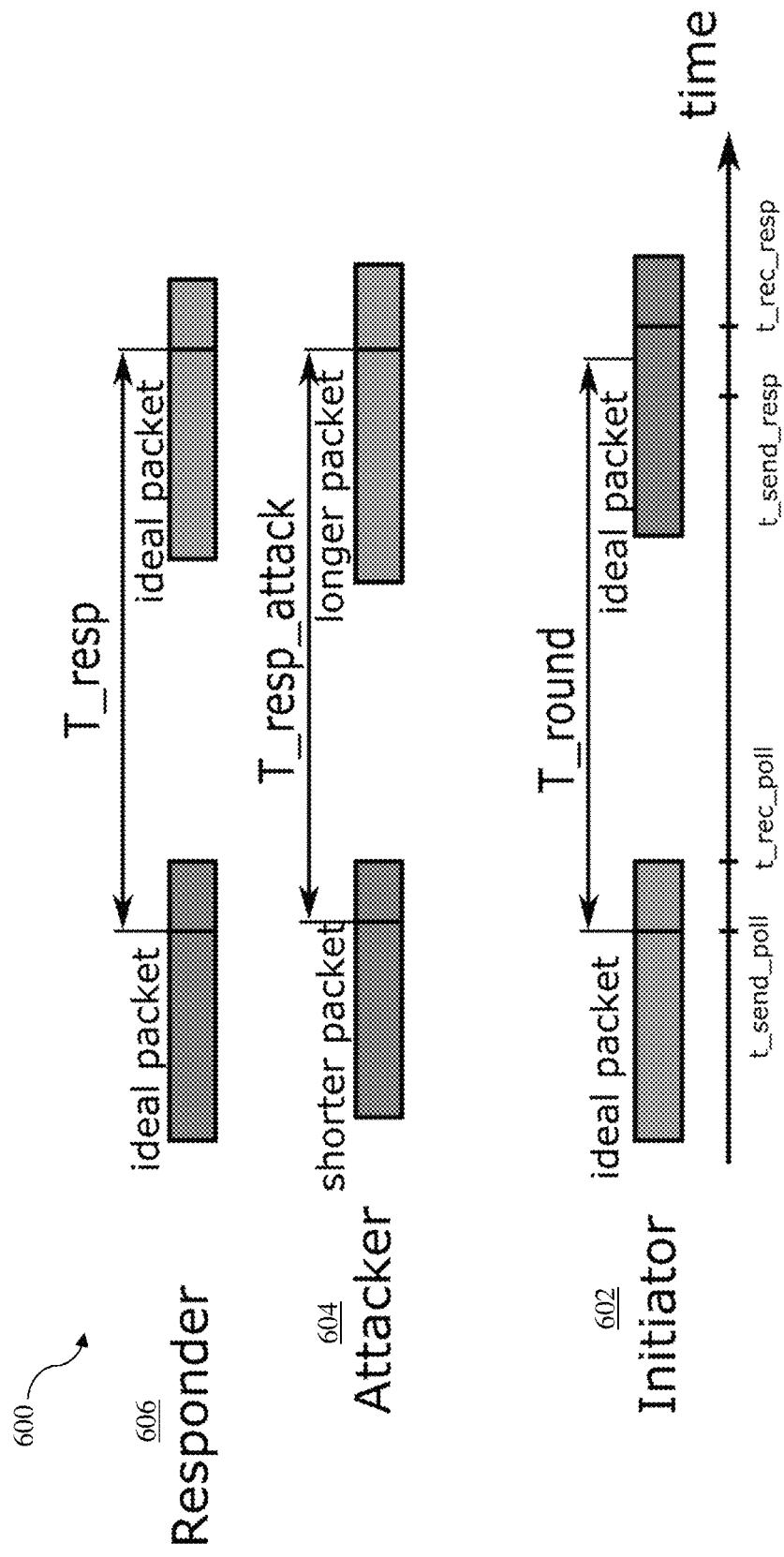
FIG. 6 shows a timing diagram of a bidirectional SS-TWR attack.

FIG. 6 shows a timing diagram 600 of a bidirectional SS-TWR attack. In a bidirectional attack, an attacker 604 may scale the packets on both sides. The initiator 602 and the responder 606 have the clock frequencies f_initiator and f_responder, respectively. In order to avoid that the scaling up of the response packet is not detected, the poll packet should be scaled down. The derivation of the required downscaling of the poll packet for avoiding an attack detection is shown in equations (17) to (23). The scaling factor k_attack_response is the scaling factor that should remain undetected from the perspective of the attacker. The scaling factor k_attack_initiator is the factor the poll packet needs to be scaled with for avoiding an attack detection. The factor k_offset_responder_initiator is the relative frequency scaling factor between the initiator clock and responder clock. Equation (22) can be setup by knowing that the measured clock frequency relation shown in equation (16) should hold to ensure that the attack is not detected.

$$\frac{f_{responder}}{f_{initiator}} = k_{offset_{responder_{initiator}}} \quad (17)$$

$$f_{attack_{response}} = f_{responder} * k_{attack_{response}} \quad (18)$$

$$f_{attack_{initiator}} = f_{initiator} * k_{attack_{initiator}} \quad (19)$$

$$k_{offset_{measured_{initiator}}} = k_{offset_{responder_{initiator}}} * k_{attack_{response}} \quad (20)$$

$$k_{offset_{measured_{responder}}} = \frac{1}{k_{offset_{responder_{initiator}}}} * k_{attack_{initiator}} \quad (21)$$

$$\frac{1}{k_{offset_{responder_{initiator}}}} * k_{attack_{initiator}} = \frac{1}{k_{offset_{responder_{initiator}}} * k_{attack_{response}}} \quad (22)$$

$$k_{attack_{initiator}} = \frac{1}{k_{attack_{response}}} \quad (23)$$

If the clock offsets used by the attacker are set as they have been derived in the equations (17) to (23), then the initiator will not be able to detect the attack merely by comparing the measured relative clock offsets. To facilitate detecting this bidirectional attack, the clock frequencies of the initiator 602 and the responder 606 may be compared with an additional, trusted clock source.

Therefore, in one or more embodiments, the processing unit is further configured to determine whether the measured frequency offset of the device clock has a further predefined correlation with a predetermined clock offset between the device clock and a reference clock and a predetermined clock offset between the counterpart clock and said reference clock. In this way, the detection of a bidirectional attack is facilitated, in addition to the detection of a unidirectional attack. In a practical implementation, the further predefined correlation is that the product of the measured frequency offset of the device clock and the predetermined clock offset between the device clock and the reference clock is equal to the predetermined clock offset between the counterpart clock and said reference clock within a given tolerance range. It will be explained in more detail below that this predefined correlation represents a suitable criterion for determining whether a bidirectional attack is carried out.

In one or more embodiments, the processing unit is further configured to determine whether the frequency offset of the counterpart clock has a predefined correlation with the measured frequency offset of the device clock and the predetermined clock offset between the counterpart clock and said reference clock. In this way, the detection of a bidirectional attack is further facilitated. In a practical implementation, the predefined correlation includes that the product of the frequency offset of the counterpart clock and the predetermined clock offset between the counterpart clock and the reference clock is equal to the measured frequency offset of the device clock within a given tolerance range. It will be explained in more detail below that this predefined correlation represents a further suitable criterion for determining whether a bidirectional attack is carried out.

In one or more embodiments, the processing unit is configured to receive data indicative of the predetermined clock offset between the counterpart clock and said reference clock through the UWB communication unit or through a further communication unit, in particular a Bluetooth communication unit, of the communication device. In this way, the determination as to whether the predefined correlations hold is facilitated. In particular, the external communication counterpart may determine the clock offset between the counterpart clock and the reference clock in a similar way as the clock offset measurement unit of the communication device may determine the clock offset between the device clock and the reference clock, and provide data indicative thereof to the communication device. For this purpose, the UWB communication channel may be used, so that no additional communication unit needs to be provided. Alternatively, the communication device may comprise a further communication unit, such as a Bluetooth communication unit, through which said data can be provided to the processing unit of the communication device.

In a practical implementation, the processing unit is configured to discard a result of the ranging session if: the measured frequency offset of the device clock does not have the further predefined correlation with the predetermined clock offset between the device clock and the reference clock and the predetermined clock offset between the counterpart clock and said reference clock; and/or the frequency offset of the counterpart clock does not have the predefined correlation with the measured frequency offset of the device clock and the predetermined clock offset between the counterpart clock and said reference clock. In this way, an effective countermeasure may be realized against an attack, in the sense that the measured distance, which is the result of the ranging session, may be ignored and no access to the object may be granted on the basis of said result. Furthermore, in one or more embodiments, the reference clock is a cellular radio unit clock, a Wi-Fi communication unit clock, a global positioning system (GPS) clock, or a clock derived from a UWB communication session with a trusted reference device. It will be explained in more detail below that these examples represent suitable and effective implementations of the reference clock.

If an external trusted clock frequency $f_{ref}$ is available to both the initiator and the responder, then the relation between the clocks may be as shown in equations (24) and (25).

$$f_{initiator} = f_{ref} * k_{offset_{initiator_{ref}}} \quad (24)$$

$$f_{responder} = f_{ref} * k_{offset_{responder_{rel}}} \quad (25)$$

Now the clock frequency of a received packet can be compared with $f_{ref}$ as reference. Equations (26) to (29) show how the measured clock frequency on the initiator side or the responder side can be converted in a relative frequency factor relative to $f_{ref}$.

$$f_{responder} = k_{offset_{measured_{initiator}}} * f_{initiator} \quad (26)$$

$$f_{initiator} = k_{offset_{measured_{responder}}} * f_{responder} \quad (27)$$

$$f_{ref} * k_{offset_{responder_{ref}}} = f_{ref} * k_{offset_{initiator_{ref}}} * k_{offset_{measured_{initiator}}} \quad (28)$$

$$f_{ref} * k_{offset_{initiator_{ref}}} = f_{ref} * k_{offset_{responder_{ref}}} * k_{offset_{measured_{responder}}} \quad (29)$$

This means that the relations shown in the equations (30) and (31) can be verified in order to detect a bidirectional attack. It is noted that the way in which the measured frequency factors are communicated may be implementation dependent.

$$k_{offset_{responder_{ref}}} = k_{offset_{initiator_{ref}}} * k_{offset_{measured_{initiator}}} \quad (30)$$

$$k_{measured_{initiator_{ref}}} = k_{offset_{responder_{ref}}} * k_{offset_{measured_{responder}}} \quad (31)$$

Now a practical example of the detection of a bidirectional attack will be described. The parameters used in this example are shown in equations (32) to (35).

$$k_{attack_{response}} = 1 - 10 \; ppm \quad (32)$$

-continued $$k_{attack_{poll}} = 1 + 10 \; ppm \quad (33)$$

$$k_{offset_{initiator_{ref}}} = 1 + 20 \; ppm \quad (34)$$

$$k_{offset_{responder_{ref}}} = 1 + 10 \; ppm \quad (35)$$

Because the response packet that is transmitted by an attacker is received by the initiator, equation (36) can be set up.

$$k_{offset_{responder_{ref}}} * k_{attack_{response}} = k_{offset_{initiator_{ref}}} * k_{offset_{measured_{initiator}}} \quad (36)$$

Based on equation (36), the left side and the right side of equation (30) do not match anymore, which means that the bidirectional attack is detected.

As mentioned above, different suitable and effective implementations of the reference clock may be envisaged. In particular, the selection of the clock which is used as a common reference clock may be system dependent. Examples of such a reference clock include a cellular radio reference clock (e.g., a GSM, 3G or 4G reference clock), a Wi-Fi reference clock, GPS reference clock, or a DS-TWR-based reference clock. In one or more embodiments, the processing unit is further configured to determine whether the measured frequency offset of the device clock has further predefined correlations with predetermined clock offsets between the device clock and a plurality of reference clocks and predetermined clock offsets between the counterpart clock and said reference clocks. Thus, a plurality of different reference clocks may be used to advantage, for example to increase the level of security of the ranging session. The use of multiple reference clocks may be regarded as a multi-factor security approach.

A cellular radio reference clock has the advantage the transceiver clock is trimmed according to the base station clock with a sub-ppm accuracy. This means that the cellular radio system clock on both systems, i.e., the initiator and the responder, will be running on the same frequency if the same base station is used. Thus, the cellular radio clock can be used directly for estimating the relative clock frequency factor of the IR-UWB clock. Even in case different base stations are used, this method is still very accurate.

The Wi-Fi reference clock may be realized as follows. It is possible to measure the time difference between multiple Wi-Fi broadcasts of an access point on the initiator and responder side. Based on the measured time difference between the broadcasts the initiator and responder Wi-Fi clock frequency offset can be estimated. By knowing the clock frequency offset of the internal Wi-Fi system to the access point and by comparing the Wi-Fi clock frequency with the IR-UWB reference clock, the clock frequency offset of the IR-UWB interface compared to the Wi-Fi access point can be estimated. If multiple access points are used, they can be synchronized over the internet.

The GPS reference clock is a useful reference clock for outdoor scenarios. For example, it is possible to use the GPS/GLONASS/GALILEO system with its atomic clock as reference. In particular, multiple signals originating from the positioning system may be combined in order to derive a common time source. This is similar to the reference clock based on the cellular network.

Figure 7:
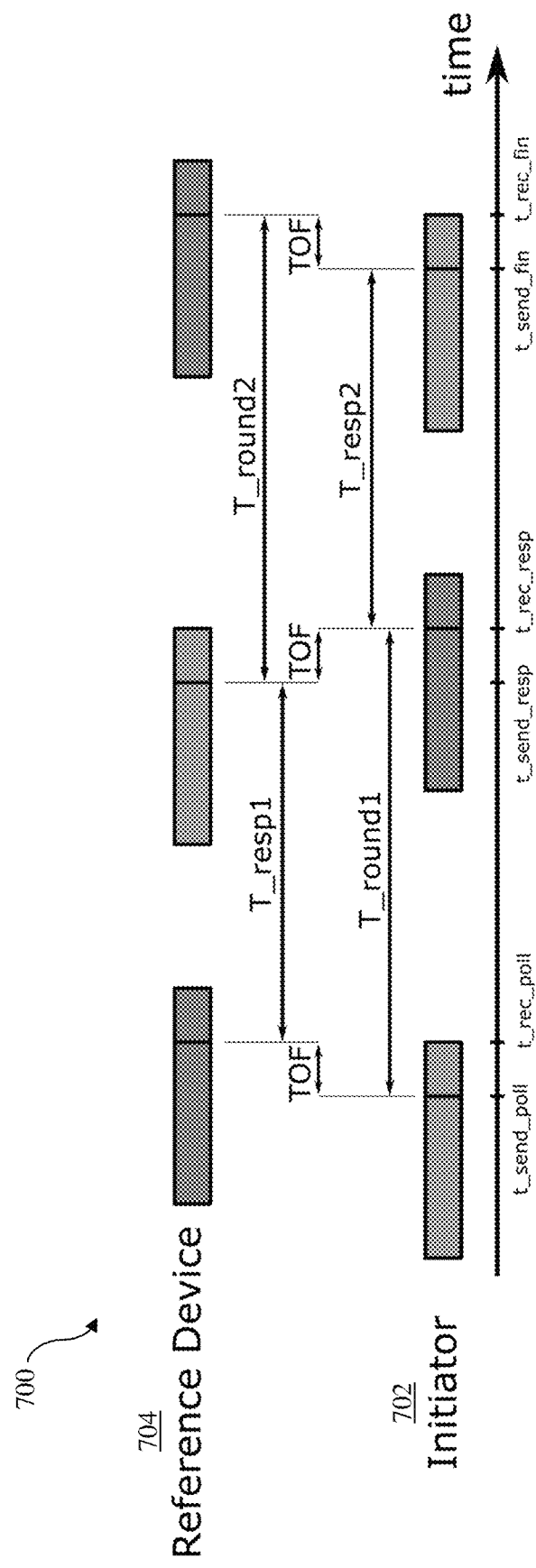
FIG. 7 shows a timing diagram of a double-sided two-way ranging (DS-TWR) session.

FIG. 7 shows a timing diagram 700 of a double-sided two-way ranging (DS-TWR) session. As mentioned above, the reference clock may be a clock derived from a UWB communication session with a trusted reference device. In that case, the clock may be derived as illustrated in FIG. 7. Equation (37) shows how the measured round trip and response times can be used for estimating the clock offset factor.

$$\frac{T_{round2} + T_{resp1}}{T_{round1} + T_{round2}} = k_{offset_{initiator_{ref}}} = \frac{f_{initiator}}{f_{ref}} \quad (37)$$

The initiator 702 shown in FIG. 7 is the initiator of the SS-TWR session that should be secured. Depending on the IR-UWB clock frequency offset behavior over a longer time period, the IR-UWB clock frequency might be estimated more frequently for avoiding frequency drift-based false positive attack detections. For less complex systems, it might also be sufficient to use a very accurate internal IR-UWB clock whose frequency behavior, for example over the temperature span, is known. By using such a clock on the initiator side and the responder side, both devices would not need an external clock.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 timing diagram of an SS-TWR session
102 initiator
104 responder
200 timing diagram of an SS-TWR session with a non-ideal clock
202 initiator
204 ideal responder
206 real responder
300 timing diagram of a clock-offset based SS-TWR attack 302 initiator
304 responder
306 attacker
400 communication device
402 UWB communication unit
404 clock offset measurement unit
406 processing unit
500 method of operating a communication device
502 executing, by a UWB communication unit of a communication device, a time-of-flight ranging session with an external communication counterpart
504 measuring, by a clock offset measurement unit of the communication device, a frequency offset of a device clock, wherein said device clock is used by the UWB communication unit when said ranging session is executed
506 determining, by a processing unit of the communication device, whether the measured frequency offset of the device clock has a predefined correlation with a frequency offset of a counterpart clock, wherein said counterpart clock is used by the external communication counterpart when said ranging session is executed
600 timing diagram of a bidirectional SS-TWR attack
602 initiator
604 attacker
606 responder
700 timing diagram of a DS-TWR session
702 initiator
704 reference device

The invention claimed is:

1. A communication device, comprising:
a communication unit configured to execute a time-of-flight ranging session with an external communication counterpart;
a clock offset measurement unit configured to measure a frequency offset of a device clock, wherein the device clock is configured to be used by the communication unit when the ranging session is executed; and
a processing unit configured
to determine whether the measured frequency offset of the device clock has a predefined correlation with a frequency offset of a counterpart clock, wherein the counterpart clock is configured to be used by the external communication counterpart when the ranging session is executed, and
to determine whether the measured frequency offset of the device clock has a further predefined correlation with a predetermined clock offset between the device clock and a reference clock and a predetermined clock offset between the counterpart clock and the reference clock, wherein the further predefined correlation is that the product of the measured frequency offset of the device clock and the predetermined clock offset between the device clock and the reference clock is equal to the predetermined clock offset between the counterpart clock and the reference clock within a given tolerance range.

2. The communication device of claim 1, wherein the communication unit is an ultra-wideband, UWB, communication unit, and wherein the processing unit is configured to receive data indicative of the frequency offset of the counterpart clock through the UWB communication unit.

3. The communication device of claim 1, comprising a further communication unit, wherein the processing unit is configured to receive data indicative of the frequency offset of the counterpart clock through the further communication unit.

4. The communication device of claim 1, wherein the processing unit is configured to discard a result of the ranging session if the measured frequency offset of the device clock does not have the predefined correlation with the frequency offset of the counterpart clock.

5. The communication device of claim 1, wherein the predefined correlation is that the measured frequency offset of the device clock is equal to the inverse of the frequency offset of the counterpart clock within a given tolerance range.

6. A communication device, comprising:
a communication unit configured to execute a time-of-flight ranging session with an external communication counterpart;
a clock offset measurement unit configured to measure a frequency offset of a device clock, wherein the device clock is configured to be used by the communication unit when the ranging session is executed; and
a processing unit configured
to determine whether the measured frequency offset of the device clock has a predefined correlation with a frequency offset of a counterpart clock, wherein the counterpart clock is configured to be used by the external communication counterpart when the ranging session is executed,
to determine whether the measured frequency offset of the device clock has a further predefined correlation with a predetermined clock offset between the device clock and a reference clock and a predetermined clock offset between the counterpart clock and the reference clock, and
to determine whether the frequency offset of the counterpart clock has a yet further predefined correlation with the measured frequency offset of the device clock and the predetermined clock offset between the counterpart clock and the reference clock, and wherein the yet further predefined correlation includes that the product of the frequency offset of the counterpart clock and the predetermined clock offset between the counterpart clock and the reference clock is equal to the measured frequency offset of the device clock within a given tolerance range.

7. The communication device of claim 1, wherein the processing unit is configured to receive data indicative of the predetermined clock offset between the counterpart clock and the reference clock through the UWB communication unit or through a further communication unit of the communication device.

8. The communication device of claim 1, wherein the processing unit is configured to discard a result of the ranging session if:
the measured frequency offset of the device clock does not have the further predefined correlation with the predetermined clock offset between the device clock and the reference clock and the predetermined clock offset between the counterpart clock and the reference clock; and/or
the frequency offset of the counterpart clock does not have the predefined correlation with the measured frequency offset of the device clock and the predetermined clock offset between the counterpart clock and the reference clock.

9. The communication device of claim 1, wherein the reference clock is a cellular radio unit clock, a Wi-Fi communication unit clock, a global positioning system, GPS, clock, or a clock derived from a UWB communication session with a trusted reference device.

10. The communication device of claim 1, wherein the processing unit is further configured to determine whether the measured frequency offset of the device clock has further predefined correlations with predetermined clock offsets between the device clock and a plurality of reference clocks and predetermined clock offsets between the counterpart clock and the reference clocks.

11. A method of operating a communication device, the communication device comprising a communication unit, a clock offset measurement unit and a processing unit, the method comprising:
  executing, by the communication unit, a time-of-flight ranging session with an external communication counterpart;
  measuring, by the clock offset measurement unit, a frequency offset of a device clock, wherein the device clock is used by the communication unit when the ranging session is executed;
  determining, by the processing unit, whether the measured frequency offset of the device clock has a predefined correlation with a frequency offset of a counterpart clock, wherein the counterpart clock is used by the external communication counterpart when the ranging session is executed; and
  determining, by the processing unit, whether the measured frequency offset of the device clock has a further predefined correlation with a predetermined clock offset between the device clock and a reference clock and a predetermined clock offset between the counterpart clock and the reference clock, wherein the further predefined correlation is that the product of the measured frequency offset of the device clock and the predetermined clock offset between the device clock and the reference clock is equal to the predetermined clock offset between the counterpart clock and the reference clock within a given tolerance range.

12. The method of claim 11, wherein the communication unit is an ultra-wideband, UWB, communication unit, and wherein the processing unit receives data indicative of the frequency offset of the counterpart clock through the UWB communication unit.

13. The method of claim 11, wherein the communication device comprises a further communication unit, and wherein the processing unit receives data indicative of the frequency offset of the counterpart clock through the further communication unit.

14. The method of claim 11, wherein the processing unit discards a result of the ranging session if the measured frequency offset of the device clock does not have the predefined correlation with the frequency offset of the counterpart clock.

15. The method of claim 11, wherein the predefined correlation is that the measured frequency offset of the device clock is equal to the inverse of the frequency offset of the counterpart clock within a given tolerance range.

16. The communication device of claim 6, wherein the processing unit is configured to receive data indicative of the predetermined clock offset between the counterpart clock and the reference clock through the UWB communication unit or through a further communication unit of the communication device.

17. The communication device of claim 6, wherein the processing unit is configured to discard a result of the ranging session if:
  the measured frequency offset of the device clock does not have the further predefined correlation with the predetermined clock offset between the device clock and the reference clock and the predetermined clock offset between the counterpart clock and the reference clock; and/or
  the frequency offset of the counterpart clock does not have the predefined correlation with the measured frequency offset of the device clock and the predetermined clock offset between the counterpart clock and the reference clock.

18. The communication device of claim 6, wherein the reference clock is a cellular radio unit clock, a Wi-Fi communication unit clock, a global positioning system, GPS, clock, or a clock derived from a UWB communication session with a trusted reference device.

19. The communication device of claim 6, wherein the processing unit is further configured to determine whether the measured frequency offset of the device clock has further predefined correlations with predetermined clock offsets between the device clock and a plurality of reference clocks and predetermined clock offsets between the counterpart clock and the reference clocks.

20. A method of operating a communication device, the communication device comprising a communication unit, a clock offset measurement unit and a processing unit, the method comprising:
  executing, by the communication unit, a time-of-flight ranging session with an external communication counterpart;
  measuring, by the clock offset measurement unit, a frequency offset of a device clock, wherein the device clock is used by the communication unit when the ranging session is executed;
  determining, by the processing unit, whether the measured frequency offset of the device clock has a predefined correlation with a frequency offset of a counterpart clock, wherein the counterpart clock is used by the external communication counterpart when the ranging session is executed;
  determining, by the processing unit, whether the measured frequency offset of the device clock has a further predefined correlation with a predetermined clock offset between the device clock and a reference clock and a predetermined clock offset between the counterpart clock and the reference clock; and
  determining, by the processing unit, whether the frequency offset of the counterpart clock has a yet further predefined correlation with the measured frequency offset of the device clock and the predetermined clock offset between the counterpart clock and the reference clock, and wherein the yet further predefined correlation includes that the product of the frequency offset of the counterpart clock and the predetermined clock offset between the counterpart clock and the reference clock is equal to the measured frequency offset of the device clock within a given tolerance range.

* * * * *